US009436881B2

(12) United States Patent
Imaeda (10) Patent No.: US 9,436,881 B2
(45) Date of Patent: Sep. 6, 2016

(54) APPARATUS FOR PREDICTING TURNS OF A VEHICLE

(75) Inventor: Koji Imaeda, Inazawa (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 257 days.

(21) Appl. No.: 14/343,617

(22) PCT Filed: Sep. 7, 2012

(86) PCT No.: PCT/JP2012/072860
§ 371 (c)(1),
(2), (4) Date: May 20, 2014

(87) PCT Pub. No.: WO2013/035828
PCT Pub. Date: Mar. 14, 2013

(65) Prior Publication Data
US 2015/0016678 A1    Jan. 15, 2015

(30) Foreign Application Priority Data

Sep. 9, 2011    (JP) .................................. 2011-197249

(51) Int. Cl.
*G06K 9/00*    (2006.01)
*B60W 30/095*    (2012.01)
*B60W 40/072*    (2012.01)
*G08G 1/16*    (2006.01)

(52) U.S. Cl.
CPC ........ *G06K 9/00825* (2013.01); *B60W 30/095* (2013.01); *B60W 40/072* (2013.01); *G08G 1/166* (2013.01); *G08G 1/167* (2013.01); *B60W 2420/42* (2013.01)

(58) Field of Classification Search
None
See application file for complete search history.

(56) References Cited

U.S. PATENT DOCUMENTS

| 9,268,740 B2 * | 2/2016 | Ogata ................... B60Q 1/143 |
| 2002/0044080 A1 * | 4/2002 | Shirai .................. G01S 13/931 342/70 |

(Continued)

FOREIGN PATENT DOCUMENTS

| JP | S62-121599 A | 6/1987 |
| JP | 1-233129 | 9/1989 |

(Continued)

OTHER PUBLICATIONS

Office Action dated Sep. 24, 2014 in corresponding Japanese Application No. 2011-197249.

(Continued)

*Primary Examiner* — Siamak Harandi
*Assistant Examiner* — Pinalben Patel
(74) *Attorney, Agent, or Firm* — Harness, Dickey & Pierce, P.L.C.

(57) ABSTRACT

An apparatus predicts a turn of a vehicle based on a picked-up image of a forward view of the vehicle. The forward view is imaged by an on-vehicle sensor to repeatedly acquire images. The acquired images include position coordinate information of a light source and information indicating whether the light source is a light source of a preceding vehicle or a light source of an oncoming vehicle. Based on such information, it is determined whether or not the light source is a light source of an oncoming vehicle newly appeared in the images and the light source is in a predetermined area near the left end or in a predetermined area near the right end in the images. When the determination result is affirmative, it is determined that there is a curve in the traveling direction of the vehicle.

1 Claim, 4 Drawing Sheets

(56) References Cited

U.S. PATENT DOCUMENTS

| | | | |
|---|---|---|---|
| 2004/0016870 A1* | 1/2004 | Pawlicki | G06K 9/4604 250/208.1 |
| 2007/0263901 A1* | 11/2007 | Wu | G06K 9/00805 382/104 |
| 2008/0181461 A1* | 7/2008 | Saito | G06K 9/00825 382/104 |
| 2009/0096634 A1* | 4/2009 | Emam | G08G 1/167 340/901 |
| 2010/0134011 A1* | 6/2010 | Kobayashi | B60Q 1/085 315/82 |
| 2011/0276258 A1* | 11/2011 | Miyakoshi | B60W 30/0956 701/117 |
| 2013/0063596 A1* | 3/2013 | Ueda | B60R 16/02 348/148 |
| 2013/0131922 A1* | 5/2013 | Ogata | B60Q 1/143 701/36 |
| 2015/0161881 A1* | 6/2015 | Takemura | G06T 7/0097 348/148 |

FOREIGN PATENT DOCUMENTS

| | | |
|---|---|---|
| JP | H06-276524 A | 9/1994 |
| JP | H07-125563 A | 5/1995 |
| JP | H07-306037 | 11/1995 |
| JP | H11-147481 A | 6/1999 |
| JP | H11-198714 | 7/1999 |
| JP | 2008-186342 A | 8/2008 |
| JP | 2009-277021 A | 11/2009 |

OTHER PUBLICATIONS

English Translation of the International Preliminary Report on Patentability for PCT/JP2012/072860 issued Mar. 12, 2014, IB, Geneva (5 pages), incorporating the English translation of the Written Opinion of the ISA for PCT/JP2012/072860, ISA/JP (4 pages), mailed Oct. 2, 2012.

International Search Report (English and Japanese) for PCT/JP2012/072860 (4 pages), ISA/JP, mailed Oct. 2, 2012.

* cited by examiner

APPARATUS FOR PREDICTING TURNS OF A VEHICLE

TECHNICAL FIELD

The present invention relates to an apparatus for predicting turns of a vehicle.

TECHNICAL BACKGROUND

Recently, systems for controlling the behaviors of a vehicle have been highly developed. For example, in order to control the angle of the headlamps of a vehicle, some of such systems make use of information that predicts a turn of the vehicle. Conventionally, as a technique for an in-vehicle system to predict a vehicle turn, the technique described in publication JP-A-H11-198714 is known. According to an example described in this publication, the road shape data recorded in a navigation device or the shape of a white line detected through lane recognition is used so that the in-vehicle system is ensured to predict whether the vehicle will make a turn afterward.

However, the information on the road shape or the white-line shape is not necessarily constantly acquired. Acquirement of more highly accurate information on turn prediction has been sought for.

SUMMARY OF THE INVENTION

Problems to be Solved by the Invention

The present invention has as its object to provide an apparatus for predicting a turn of a vehicle using a new method that has not been conventionally used.

Means for Solving the Problems

In order to achieve the above object, a first aspect provides an apparatus for predicting a turn of a vehicle on the basis of viewing field information indicating a viewing field in a forward direction of the vehicle, the information being acquired from a sensor installed in the vehicle. The apparatus includes: an information acquiring means that acquires information on a position coordinate of a surrounding object of the vehicle on the basis of the viewing field information, the surrounding object being present in the viewing field, and surrounding-object information indicating whether the surrounding object is a preceding vehicle or an oncoming vehicle; a determining means that determines whether or not the surrounding object is an oncoming vehicle and the surrounding object is in a predetermined area on the left side or in a predetermined area on the right side in a detection range of the viewing field, on the basis of the surrounding-object information acquired by the information acquiring means; and a predicting means that predicts there is a curve in a traveling direction of the vehicle when a determination result of the determining means is affirmative and predicts there is no possible turn of the vehicle when a determination result of the determining means is negative.

In this way, for example, the presence of a curve in the traveling direction of the vehicle is predicted on the basis of the fact that an oncoming vehicle has appeared near the left end or near the right end of a picked-up image as a viewing field image. Thus, a possible turn of the vehicle can be predicted making use of the behaviors of the oncoming vehicle in the picked-up image.

For example, the sensor is configured to repeatedly acquire a picked-up image as the viewing field information by picking up an image in a forward direction of the vehicle; the information acquiring means is configured to repeatedly acquire a position coordinate of a light source in a picked-up image that is repeatedly acquired by the sensor, information indicating whether the light source is a light source of a preceding vehicle or a light source of an oncoming vehicle, and a distance from the light source to the vehicle, as the surrounding-object information, on the basis of the picked-up image; and the determining means is configured to determine whether or not a distance from the light source to the vehicle is not less than a specified distance, the light source is a light source of an oncoming vehicle that has newly appeared in the picked-up image, and the light source is in a predetermined area near the left end or in a predetermined area near the right end in the picked-up image, on the basis of the repeatedly acquired surrounding-object information.

For example, one of the conditions based on which the determining means makes a determination is that the distance from light source(s) to the vehicle is equal to or more than a specified distance. Accordingly, in a situation where a nearby oncoming vehicle has abruptly changed lane on a straight road, there is a low probability of erroneously determining the presence of a curve in the traveling direction of the vehicle. As a result, a turn is more accurately predicted.

Further, for example, the predicting means is configured to predict there is a left-hand curve in a traveling direction of the vehicle on the basis of the fact that the light source is in the predetermined area near the left end in the picked-up image, and predict there is a right-hand curve in a traveling direction of the vehicle on the basis of the fact that the light source is in the predetermined area near the right end in the picked-up image, when a determination result of the determining means is affirmative.

Thus, a left turn or a right turn of the vehicle is distinguishably predicted.

Further, a second aspect provides an apparatus for predicting a turn of a vehicle. The apparatus includes: a determining means that determines, on the basis of a picked-up image in a forward direction of a vehicle repeatedly picked up by a camera installed in the vehicle, whether or not an oncoming vehicle has entered the picked-up image from the left end or the right end of the picked-up image; and a predicting means that predicts there is a curve in a traveling direction of the vehicle when a determination result of the determining means is affirmative, and predicts there is no possible turn of the vehicle when a determination result of the determining means is negative.

Thus, a curve is determined to be present in the traveling direction of the vehicle on the basis of the fact that an oncoming vehicle has entered the picked-up image from the left end or the right end of the picked-up image. In this way, a turn of the vehicle can be detected making use of the behaviors of the oncoming vehicle in the picked-up image.

MODES FOR IMPLEMENTING THE INVENTION

Figure 1:
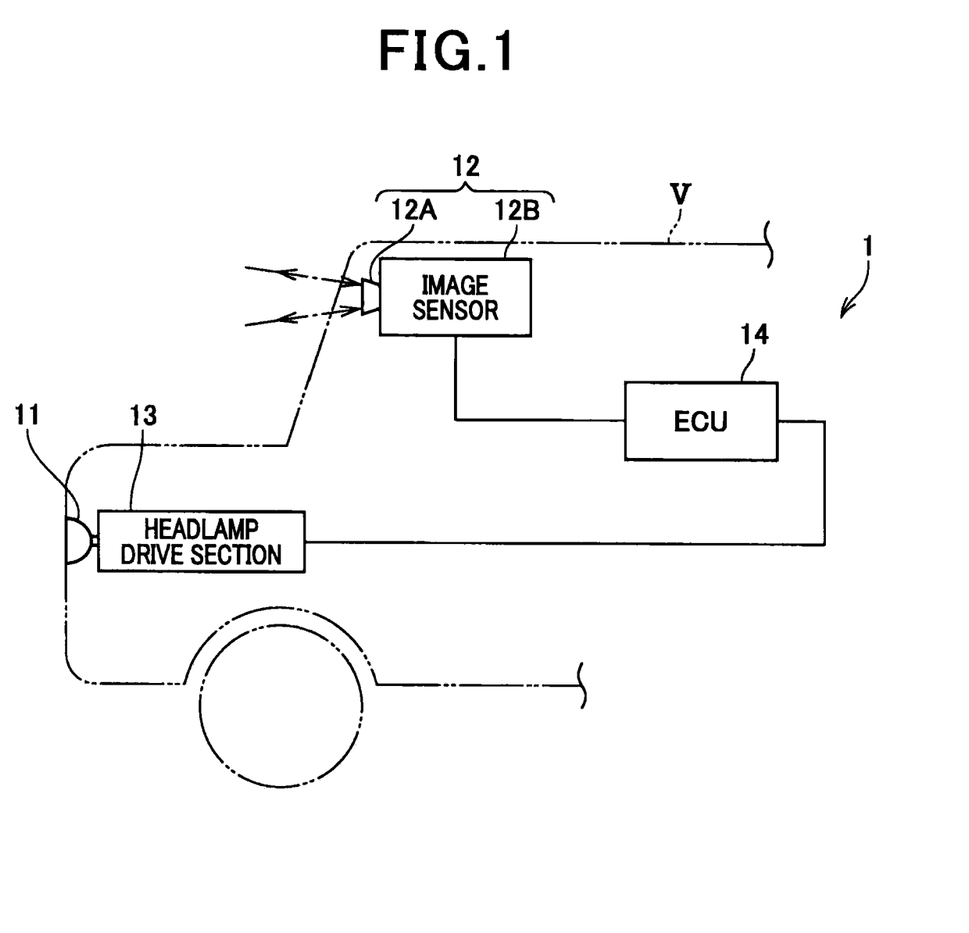
FIG. 1 is a schematic diagram illustrating a vehicle headlamp control system 1 related to an embodiment of the present invention.

Hereinafter is described a first embodiment of the present invention. FIG. 1 shows a configuration of a vehicle headlamp control system 1 related to the present embodiment.

The vehicle headlamp control system 1, which is installed in a vehicle, is a system for controlling two headlamps of the vehicle and includes an image sensor 12, a headlamp drive section 13 and an ECU (electronic control unit) 14.

The image sensor 12 includes a camera section 12A and a detection section 12B. The image sensor 12 has a function of a recognition sensor which recognizes (e.g., images) a viewing field around the vehicle to grasp the presence of surrounding objects (including a preceding vehicle and an oncoming vehicle).

The camera section 12A repeatedly (e.g., periodically at a 1/30 sec. cycle) picks up images of a road surface, for example, in the forward direction of a vehicle 10 and sequentially outputs the picked-up images (corresponding to the viewing field information or the image information) resulting from the imaging to the detection section 12B. For the picked-up images outputted from the camera section 12A, the detection section 12B sequentially performs a well-known detection process to attempt to detect light source(s) (object(s)) that can be recognized as being a vehicle on the basis such as of a luminance of a predetermined value or more, shape and color) in a picked-up image. Then, when one or more light sources have been detected in a picked-up image, the detection section 12B specifies a position coordinate of a left-end light source located at a leftmost position, a position coordinate of a right-end light source located at a rightmost position and a position coordinate of a lower-end light source located at a lowermost position, from among the light sources. Further, the detection section 12B prepares preceding-vehicle/oncoming-vehicle information that indicates whether the left-end light source, the right-end light source or the lower-end light source is the light source of a preceding vehicle or a light source of an oncoming vehicle. Furthermore, the detection section 12B specifies a position coordinate of a nearest light source from among the detected light sources, the light source being nearest the vehicle that installs the vehicle headlamp control system 1 (hereinafter, just referred to as "the vehicle" which is distinguished from an oncoming vehicle or a preceding vehicle), and a distance from the nearest light source to the vehicle.

Then, the detection section 12B outputs the information acquired in this way to the ECU 14 as information showing the presence of the objects surrounding the vehicle, i.e. surrounding-object information (or the information on light sources). The surrounding-object information includes the position coordinates (in the picked-up image) of the left-end light source, the right-end light source, the lower-end light source, as well as the preceding-vehicle/oncoming-vehicle information, the position coordinate of the nearest light source and the distance from the nearest light source to the vehicle.

Whether the left-end light source, the right-end light source and the lower-end light source are the light sources of a preceding vehicle (i.e. luminous tail lamps) or the light sources of an oncoming vehicle (i.e. headlamps) is determined on the basis of the color and the shape of the light sources. Specifically, let us take an example that there is a single light source (any of the left-end light source, the right-end light source and the lower-end light source). If there is a different light source on the left or right of the single light source, with the vertical position being substantially the same as that of the single light source, and feature quantities (e.g., shape and color) of the different light source are analogous to those of the single light source to an extent of a predetermined reference or more, the single light source is determined to be the light source (headlamp or tail lamp) of another vehicle. Further, if the color of the single light source is closer to white rather than red, the single light source is determined to be the light source of an oncoming vehicle (headlamp). If the color of the single light source is closer to red rather than white, the single light source is determined to be the light source of a preceding vehicle (tail lamp).

Further, in order to specify the nearest light source from among the light sources that have been detected, it is necessary to specify the distance from each light source to the vehicle. As a method of specifying a distance to a light source, either one or both of the following two specifying methods 1 and 2 may be used.

Specifying Method 1:

The camera section 12A of the image sensor 12 includes two cameras which are provided at different positions of the vehicle (specifically, positions that are spaced apart in the right-left direction of the vehicle but are located at the same longitudinal position of the vehicle). An image of a light source is concurrently picked up by the two cameras. Then, the positional deviation between the light sources in the resultant two picked-up images is used as a basis to specify the distance from the longitudinal position to the light source. The method of specifying a distance to an object based on such a stereo imaging is a well-known technique, which is described, for example, in publication JP-A-H07-306037.

Specifying Method 2:

In a picked-up image, two light sources in a pair juxtaposed in the horizontal direction (headlamps or tail lamps) are specified as light sources of a single vehicle. Whether the two light sources juxtaposed in the horizontal direction correspond to a pair of light sources of a single vehicle is determined on the basis of whether the feature quantities (e.g., shape and color) of the two light sources are analogous to each other to an extent of a predetermined reference or more. A distance A between the pair in the picked-up image is specified. Based on this distance, a distance B from the pair of light sources to the vehicle is specified. The correlation between the distances A and B is determined by referring to the correlation recorded in advance as a correlation map in the detection section 12B. In the correlation map, it is ensured that, as the distance A becomes larger, the distance B also becomes larger. The correlation map is prepared according to the characteristics of the cameras, assuming that the distance between the headlamps or the distance between the tail lamps of a vehicle is constant. Such a specifying method 2 is also well known. For example, publications JP-A-H06-276524 and JP-A-S62-121599 describe such a method.

The device, such as the image sensor 12 that includes the camera section 12A and the detection section 12B and outputs the surrounding-object information as mentioned above, has already been put to practical use. Specifically, all models of Lexus LS that Toyota Jidosha Kabushiki Kaisha sells in the U.S.A. include this device as standard equipment. The device is used for realizing an automatic high beam function.

The headlamp drive section 13 is an actuator that controls activation, deactivation, illumination direction, illumination range and the like of headlamps 11. The headlamp drive section 13 includes a swivel motor that changes (i.e. swivels) the illumination direction of each of the headlamps 11 in the right-left direction of the vehicle.

The ECU 14 (corresponding to an example of the turn prediction apparatus) is an electronic control unit that includes a microcomputer. The ECU 14 executes the programs recorded in advance in the ECU 14 to perform various processes for controlling the optical axes of the headlamps 11.

Hereinafter is described an operation of the vehicle headlamp control system 1 in a state where the headlamps 11 are activated (e.g., in nighttime). As basic control, the ECU 14 acquires a detection signal from a steering angle sensor, not shown, of the vehicle. Based on the acquired detection signal, the ECU controls the swivel motor of the headlamp drive section 13 to thereby direct the optical axes of the headlamps 11 to the traveling direction of the vehicle which has been determined according to the steering angle of the vehicle.

Specifically, when the steering angle from the center position (i.e. position allowing the vehicle to travel straight ahead) is in a predetermined idle angle (e.g., 30°), the ECU directs the optical axes of the headlamps 11 straight ahead of the vehicle. When the steering angle from the center position exceeds the idle angle to offset rightward by an angle α, the ECU directs the optical axes of the headlamps 11 to a direction which is offset rightward by a predetermined angle β with reference to the direction straight ahead of the vehicle. Similarly, when the steering angle from the center position exceeds the idle angle to offset leftward by the angle α, the ECU directs the optical axes of the headlamps 11 to a direction which is offset leftward by the predetermined angle β with reference to the direction straight ahead of the vehicle. The angle β may have a value that becomes larger as the angle α becomes larger. Further, the angle β may vary in accordance with the speed of the vehicle.

Performing the basic control described above, when the vehicle enters a curve, the ECU 14 directs the optical axes of the headlamps 11 toward the traveling direction instead of the forward direction of the vehicle. This enhances the visibility of the road in a curve.

In addition to the basic control described above, at a position short of a curve, the ECU 14 determines that there is a curve in the traveling direction of the vehicle even when the steering angle from the center position is still in the idle angle. Then, the ECU performs in advance the control of moving the optical axes of the headlamps 11 to the direction of the curve (rightward direction if the curve is a right-hand curve).

Figure 2:
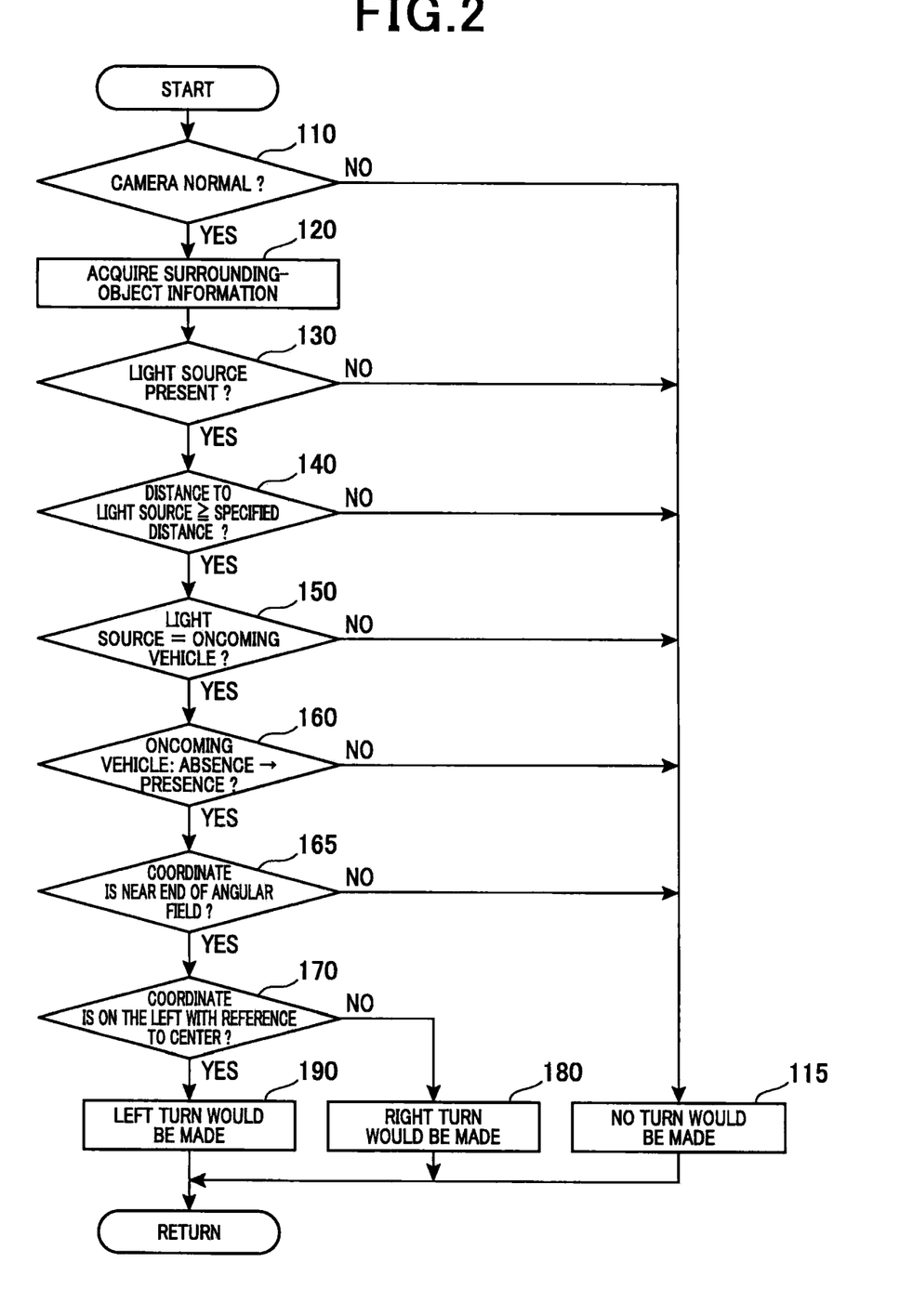
FIG. 2 is a flowchart illustrating a turn prediction process executed by an ECU.

Therefore, the ECU 14 is ensured to repeatedly perform a vehicle turn prediction process shown in FIG. 2 when the steering angle from the center position is in the idle angle. Hereinafter, along the vehicle turn prediction process, the operation of the vehicle headlamp control system 1 is described on a case-by-case basis.

[Case 1]

In the case described here, the vehicle equipped with the system 1 travels on a straight ahead road in nighttime or in a tunnel and there is no vehicle in the imaging range of the camera section 12A. In this case, the ECU 14 determines, first, at step 110, whether or not the camera section 12A of the headlamps 12 is normal. If the camera section 12A of the headlamps 11 has a failure or the like in itself, the camera section 12A is ensured to output a predetermined failure signal to the ECU 14. In accordance with the presence/absence of the failure signal, the ECU 14 determines the camera section 12A to be normal in the absence of the failure signal and not to be normal in the presence of the failure signal. If the camera section is determined not to be normal, control proceeds to step 115 at which the ECU determines that there would be no possible turn and allows the process to return to step 110. In this case, the optical axes of the headlamps 11 are not changed.

If the camera section is determined to be normal, control proceeds to step 120. At step 120, the ECU acquires the surrounding-object information from the image sensor 12 and then control proceeds to step 130. As in the present case, under the condition that no vehicle is present in the imaging range of the camera section 12A, the detection section 12B of the image sensor 12 is not able to find a light source in the picked-up images. Accordingly, the detection section outputs a signal, as the surrounding-object information, to the ECU 14 to indicate the absence of a light source.

At step 130, the ECU determines whether or not there is a light source in the picked-up images, on the basis of the surrounding-object information acquired at the immediately preceding step 120. In the present case, the surrounding-object information indicates that there is no light source. Therefore, the ECU determines that there is no light source and then control proceeds to step 115. At step 115, the ECU determines that there would be no possible turn and allows the process to return to step 110. In this case, the optical axes of the headlamps 11 are not changed. Accordingly, in the present case, processings of steps 110, 120, 130 and 115 are repeated in this order unless the vehicle enters a curve and the driver turns the steering wheel to cause the steering angle from the center position to be an angle exceeding the idle angle. Thus, the optical axes of the headlamps 11 remain being oriented in the forward direction of the vehicle 10.

[Case 2]

Figure 3:
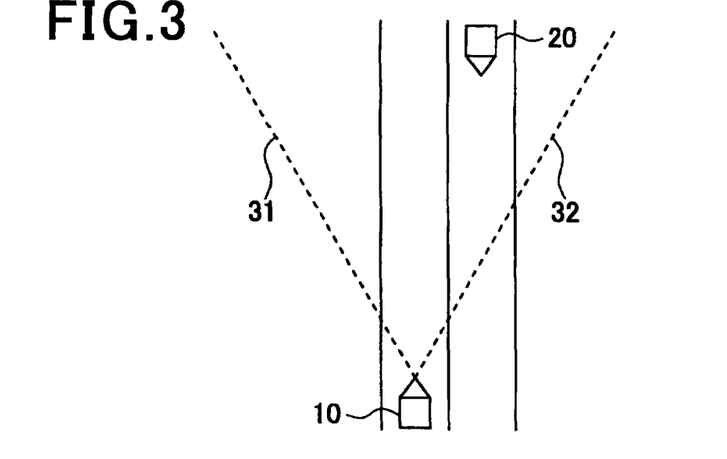
FIG. 3 is a diagram illustrating a situation in which an oncoming vehicle 20 is present in a forward direction of an own vehicle 10 on a straight ahead road.

In the case described here, as shown in FIG. 3, the vehicle 10 travels on a straight ahead road in nighttime or in a tunnel and an oncoming vehicle 20 approaches the vehicle 10. In this case, when the oncoming vehicle 20 is far from the vehicle 10, the detection section 12B of the image sensor 12 is not able to detect the light sources (luminous headlamps) of the oncoming vehicle in the picked-up images. Accordingly, in this case, similar to Case 1, the ECU determines, at step 130, that there is no light source. Thus, processings of steps 110, 120, 130 and 115 are repeated in this order. Then, when the oncoming vehicle 20 approaches the vehicle 10 to some extent, the detection section 12B of the image sensor 12 detects the light sources (pair of luminous headlamps) of the oncoming vehicle 20 in a picked-up image.

In response to the detection, the detection section 12B outputs, as the surrounding-object information, the position coordinates of the left-end light source, the right-end light source, the lower-end light source and the nearest light source from among the light sources (pair of luminous headlamps) in the picked-up image, the preceding-vehicle/ oncoming-vehicle information indicating that the left-end light source, the right-end light source and the lower-end to light source are the light sources of an oncoming vehicle, and the information on the distance from the nearest light source to the vehicle. In the present case, the lower-end light source and the nearest light source coincide with either of the left-end light source and the right-end light source. For example, in the present case, the lower-end light source coincides with the left-end light source, while the nearest light source coincides with the right-end light source.

The ECU 14 that has acquired such surrounding-object information at step 120 determines, at the subsequent step 130, that light sources are present in the picked-up image. Then, control proceeds to step 140. At step 140, the ECU compares a distance L from the nearest light source (equal to the left-end light source in the present case) to the vehicle 10 with a specified distance, on the basis of the surrounding-object information acquired at the immediately preceding step 120 to determine whether or not the distance L is equal to or larger than the specified distance. The specified distance is a predetermined distance which is 50 meters, for example.

At the point when the detection section 12B of the image sensor 12 has detected the light sources of the oncoming vehicle 20, the distance L from the light sources of the oncoming vehicle 20 to the vehicle 10 is almost always equal to or larger than the specified distance. In order to satisfy this, the length of the specified distance and the detection sensitivity of the detection section 12B are adjusted in advance on the basis of the brightness of typical headlamps. In other words, the detection section 12B is ensured to detect the light of the headlamps from the forward direction in a distance exceeding the specified distance, as being light sources. Accordingly, at step 140 in the present case, the ECU almost always determines that the distance L is equal to or larger than the specified distance and then control proceeds to step 150.

At step 150, the ECU determines whether or not the nearest light source (equal to the left-end light source in the present case) is the light source of an oncoming vehicle, on the basis of the surrounding-object information acquired at the immediately preceding step 120. In the present case, the nearest light source is determined to be the light source of an oncoming vehicle on the basis of the preceding-vehicle/ oncoming-vehicle information of the surrounding-object information. Then, control proceeds to step 160.

At step 160, the ECU determines whether or not the current time point is immediately after the change from "absence" to "presence" of an oncoming vehicle, on the basis of the surrounding-object information acquired at the immediately preceding step 120 (i.e. in the process of FIG. 2 of the present cycle) (hereinafter referred to as present-cycle surrounding-object information) and the surrounding-object information acquired at step 120 in the process of FIG. 2 of one cycle before the present cycle (hereinafter referred to as previous-cycle surrounding-object information). In the present case, the previous-cycle surrounding-object information includes information indicating the absence of a light source, while the present-cycle surrounding-object information includes information indicating that the light sources including the left-end light source are the light sources of an oncoming vehicle. Therefore, the current time point is determined to be immediately after the change from "absence" to "presence". Then, control proceeds to step 165.

At step 165, the ECU determines whether or not the coordinate of the nearest light source (equal to the left-end light source in the present case) is positioned in a predetermined area near the left end of the picked-up image or in a predetermined area near the right end thereof. The predetermined area near the left end and the predetermined area near the right end are determined in advance as coordinate areas in a picked-up image. For example, in the picked-up image shown in FIG. 4, a left-side range 41 that occupies ¼ (or less than ¼) of the entire range is determined to be the predetermined area near the left end, and a right-side range 43 that occupies ¼ (or less than ¼) of the entire range is determined to be the predetermined area near the right end.

Figure 4:
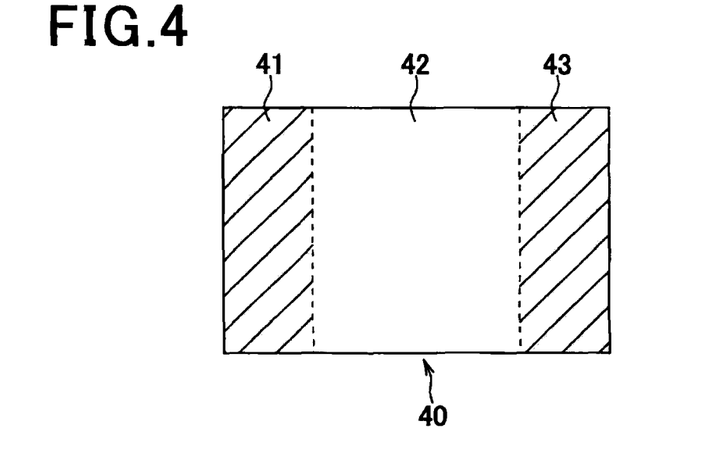
FIG. 4 is a diagram illustrating an imaging range of a camera.

In the present case, the ECU has just started to detect the light sources of the oncoming vehicle 20 on a straight ahead road. In addition, the light sources of the oncoming vehicle 20 are distanced from the vehicle 10 by the specified distance or more. Therefore, the detected nearest light source should be present in a center range 42 but not in the range 41 or 42. Accordingly, in the present case, the ECU determines that the coordinate position of the nearest light source is present neither in the area near the left end, nor in the area near the right end. Then, control proceeds to step 115. At step 115, the ECU determines that there would be no possible turn. In this case, the optical axes of the headlamps 11 are not changed.

After that, the process returns to step 110 and, similar to the foregoing procedure, the process proceeds along steps 110, 120, 130, 140, 150 and 160. However, at step 160, since the previous-cycle surrounding-object information at the time also includes the information indicating that the light sources including the left-end light source are the light sources of an oncoming vehicle, control proceeds to steps 160 and 115, where the ECU determines that there would be no possible turn. Then, the ECU allows the process to return to step 110. After that, the processing of steps 110, 120, 130, 140, 150, 160 and 115 is repeated until the oncoming vehicle 20 goes out of the imaging range of the camera section 12A, unless the vehicle enters a curve to allow the driver to turn the steering wheel and the steering angle from the center position exceeds the idle angle. In this case, the optical axes of the headlamps 11 are not changed but remain being oriented to the forward direction of the vehicle 10. After the oncoming vehicle 20 has gone out of the imaging range of the camera section 12A, the same process as that of Case 1 is performed.

[Case 3]

Figure 5:
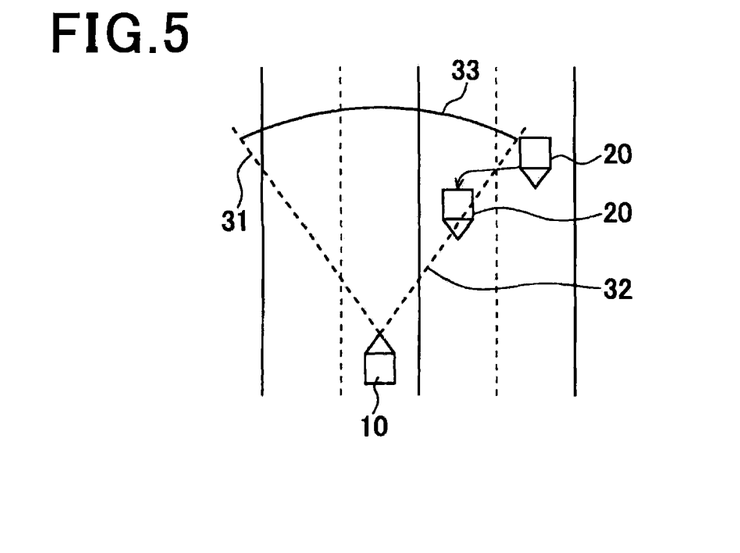
FIG. 5 is a diagram illustrating a situation in which the oncoming vehicle 20 has changed lane on the straight ahead road and entered an imaging range 33.

In the case described here, as shown in FIG. 5, the vehicle 10 travels on a straight ahead road in nighttime or in a tunnel, and the oncoming vehicle 20 changes lane in the vicinity of the vehicle 10 as indicated by the arrow to enter the imaging range of the camera section 12A (the range enclosed by the dotted lines 31 and 32). In this case, when the oncoming vehicle 20 initially is out of the imaging range, the same process as that of Case 1 is performed. Then, when the oncoming vehicle 20 changes lane and enters the imaging range, the detection section 12B of the image sensor 12 detects the light sources (pair of luminous headlamps) of the oncoming vehicle 20 in a picked-up image.

Then, the detection section 12B outputs, as the surrounding-object information, the position coordinates of the left-end light source, the right-end light source, the lower-end light source and the nearest light source from among the light sources (pair of luminous headlamps) in the picked-up image, the preceding-vehicle/oncoming-vehicle information indicating that the left-end light source, the right-end light source and the lower-end light source are the light sources of an oncoming vehicle, and the information on the distance from the nearest light source to the vehicle. In the present case, the lower-end light source and the nearest light source coincide with either of the left-end light source and the right-end light source. For example, in the present case, the lower-end light source coincides with the left-end light source and the nearest light source coincides with the right-end light source. The ECU 14 that has acquired such surrounding-object information at step 120 determines, at the subsequent step 130, that light sources are present in the picked-up image. Then, control proceeds to step 140.

At step 140, the ECU compares the distance L from the nearest light source (equal to the left-end light source in the present case) to the vehicle 10 with the specified distance (distance from the vehicle 10 to the solid line 33 in FIG. 5) on the basis of the surrounding-object information acquired at the immediately preceding step 120 to determine whether or not the distance L is equal to or larger than the specified distance. In the present case, as shown in FIG. 5, since the distance from the light sources (headlamps) of the oncoming vehicle 20 to the vehicle 10 is less than the specified distance, the distance L is determined to be less than the specified distance. Then, the process proceeds to step 115. At step 115, the ECU determines that there would be no possible turn. In this case, the optical axes of the headlamps 11 are not changed.

When the light sources of the oncoming vehicle 20 are distanced from the vehicle 10 by the specified distance or more, the light sources are regarded to be present at positions that allow the entire width of the road to be included in the imaging range. Therefore, in the first place, the light sources of an oncoming vehicle are unlikely to newly enter the imaging range by the change of lane.

After that, while the oncoming vehicle 20 is in the imaging range, control returns to step 110. Then, similar to the foregoing procedure, control proceeds along steps 110, 120, 130, 140 and 115. Thus, the optical axes of the headlamps 11 are not changed but remain being oriented to the forward direction of the vehicle 10. After the oncoming vehicle 20 has gone out of the imaging range of the camera section 12A, the same process as that of Case 1 is performed.

[Case 4]

Figure 6:
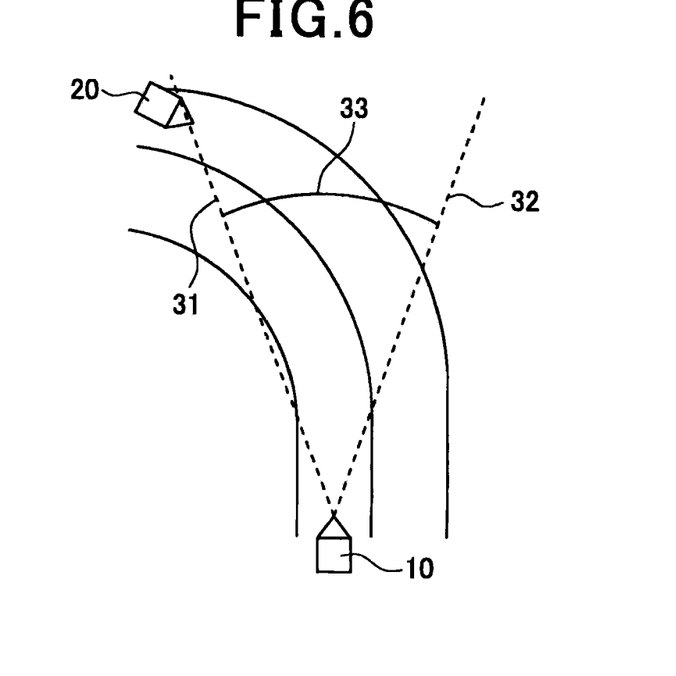
FIG. 6 is a diagram illustrating a situation in which the oncoming vehicle 20 has appeared from a left forward direction when the own vehicle 10 is positioned short of a left-hand curve.

In the case described here, as shown in FIG. 6, the vehicle 10 equipped with the present system 1 travels straight towards a left-hand curve in nighttime or in a tunnel, and the oncoming vehicle 20 enters the imaging range of the camera section 12A from the left by traveling along the curve. In this case, when the oncoming vehicle 20 initially is out of the imaging range, the same process as in Case 1 is performed. Then, when the oncoming vehicle 20 has entered the imaging range, the detection section 12B of the image sensor 12 detects the light sources (pair of luminous headlamps) of the oncoming vehicle 20 in a picked-up image.

In response to the detection, the detection section 12B outputs, as the surrounding-object information, the position coordinates of the left-end light source, the right-end light source, the lower-end light source and the nearest light source from among the light sources (pair of luminous headlamps) in the picked-up image, the preceding-vehicle/oncoming-vehicle information indicating that the left-end light source, the right-end light source and the lower-end light source are the light sources of an oncoming vehicle, and the information on the distance from the nearest light source to the vehicle. In the present case, the lower-end light source and the nearest light source coincide with either of the left-end light source and the right-end light source. For example, in the present case, the lower-end light source coincides with the left-end light source and the nearest light source coincides with the right-end light source.

The ECU 14 that has acquired such surrounding-object information at step 120 determines, at the subsequent step 130, that light sources are present in the picked-up image. Then, control proceeds to step 140. At step 140, the ECU compares the distance L from the nearest light source (equal to the left-end light source in the present case) to the vehicle 10 with the specified distance, on the basis of the surrounding-object information acquired at the immediately preceding step 120 to determine whether or not the distance L is equal to or larger than the specified distance. In the present case, the distance from the light sources of the oncoming vehicle 20 to the vehicle 10 (distance from the vehicle 10 to the solid line 33) is equal to or larger than the specified distance. Accordingly, it is determined that the distance L is equal to or larger than the specified distance. Then, control proceeds to step 150.

At step 150, the ECU determines whether or not the nearest light source (equal to the left-end light source in the present case) is the light source of an oncoming vehicle on the basis of the present-cycle surrounding-object information acquired at the immediately preceding step 120. In the present case, the ECU determines that the nearest light source is the light source of an oncoming vehicle on the basis of the preceding-vehicle/oncoming-vehicle information of the present-cycle surrounding-object information. Then, control proceeds to step 160.

At step 160, the ECU determines whether or not the current time point is immediately after the change from "absence" to "presence" of an oncoming vehicle, on the basis of the present-cycle surrounding-object information acquired at the immediately preceding step 120 (i.e. in the process of FIG. 2 of the present cycle) and the previous-cycle surrounding-object information acquired at step 120 in the process of FIG. 2 of one cycle before the present cycle. In the present case, the previous-cycle surrounding-object information includes information indicating the absence of light sources, while the present-cycle surrounding-object information includes information indicating that the light sources including the left-end light source are the light sources of an oncoming vehicle. Therefore, the ECU determines that the current time point is immediately after the change from "absence" to "presence" of an oncoming vehicle. Then, control proceeds to step 165.

At step 165, the ECU determines whether or not the position coordinate of the nearest light source (equal to the left-end light source in the present case) is in the predetermined area near the left end of the picked-up image or in the predetermined area near the right end thereof. The predetermined area near the left end and the predetermined area near the right end are as explained above. In the present case, the oncoming vehicle 20, which has just entered the imaging range of the camera section 12A from the left, is in the predetermined area near the left end. Accordingly, the ECU determines that the position coordinate of the nearest light source is in the predetermined area near the left end of the picked-up image. Then, control proceeds to step 170.

At step 170, the ECU determines whether the position coordinate of the nearest light source (equal to the left-end light source in the present case) is on the left or on the right with reference to the center of the picked-up image. In the present case, since the position coordinate of the nearest light source is on the left with reference to the center, the ECU determines that the position coordinate is on the left. Then, control proceeds to step 190.

At step 190, the ECU predicts that there is a left-hand curve in the traveling direction of the vehicle. Then, based on the prediction, the ECU uses the headlamp drive section 13 to control the optical axes of the headlamps 11, in spite of the fact that the steering angle from the center position is in the range of the idle angle. Specifically, the ECU activates the swivel motor of the headlamp drive section 13 such that the optical axes of the headlamps 11 are oriented to the left by a predetermined angle (e.g., 10°) with reference to the forward direction (straight ahead direction) of the vehicle 10.

After that, the ECU 14 terminates the process of FIG. 2 and allows the optical axes of the headlamps 11 controlled as above to remain being oriented to the left to thereby retain the optical axes. The retention of the optical axes is stopped when the steering angle from the center position has exceeded the range of the idle angle. After that, the ECU 14 returns to the basic control described above and performs optical axis control of the headlamps 11 in accordance with the steering angle. In other words, the ECU performs optical axis control in accordance with the manipulation of the steering wheel in traveling along the curve. Then, when the vehicle has finished traveling along the curve and the steering angle from to the center position has returned to a position in the range of the idle angle, the ECU 14 starts the process of FIG. 2 again.

The retention of the optical axes after terminating the process of FIG. 2 is stopped when the steering angle from the center position continues to stay in the range of the idle angle for a predetermined period (e.g., three seconds) or more after the termination of the process of FIG. 2. After that, the ECU 14 returns to the basic control described above and performs optical axis control of the headlamps 11 in accordance with the steering angle. In other words, the optical axes are returned to the forward direction of the vehicle.

[Case 5]

Figure 7:
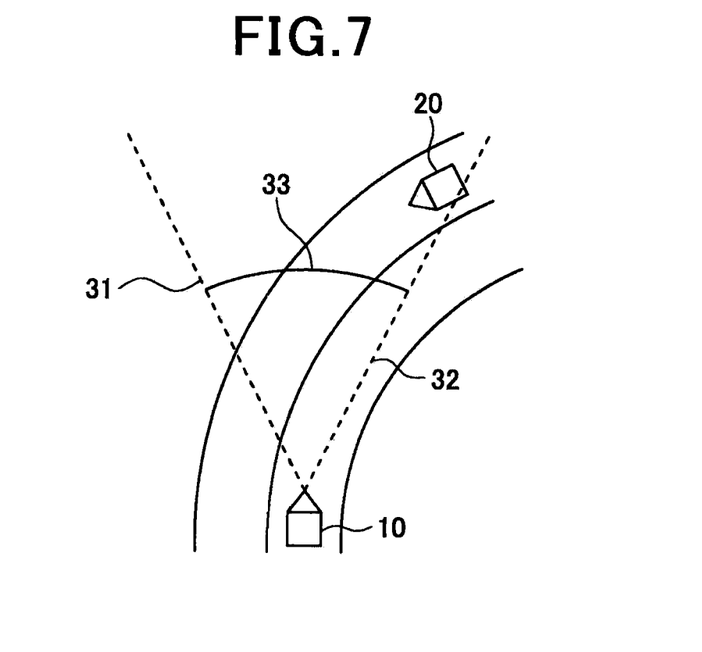
FIG. 7 is a diagram illustrating a situation in which the oncoming vehicle 20 has appeared from a right forward direction when the own vehicle 10 is positioned short of a right-hand curve.

In the case described here, as shown in FIG. 7, the vehicle 10 travels straight ahead short of a right-hand curve in nighttime or in a tunnel, and the oncoming vehicle 20 enters the imaging range of the camera section 12A from the right by traveling along the curve. In this case, when the oncoming vehicle 20 initially is out of the imaging range, the same process as in Case 1 is performed. Then, when the oncoming vehicle 20 enters the imaging range, the detection section 12B of the image sensor 12 detects the light sources (pair of luminous headlamps) of the oncoming vehicle 20 in a picked-up image.

In this case, the processings of steps 110 to 165 are the same as those in Case 4. At step 165, at step 165, the ECU determines whether or not the position coordinate of the nearest light source (equal to the left-end light source in the present case) is in the predetermined area near the left end or in the predetermined area near the right end in the picked-up image. In the present case, the oncoming vehicle 20, which has just entered the imaging range from the right end thereof, is in the predetermined area near the right end. Accordingly, the ECU determines that the position coordinate of the nearest light source is present in the predetermined area near the right end of the picked-up image. Then, control proceeds to step 170.

At step 170, the ECU determines whether or not the position coordinate of the nearest light source (equal to the left-end light source in the present case) is on the left or on the right with reference to the center of the picked-up image. In the present case, since the position coordinate of the nearest light source is on the right with reference to the center, the ECU determines that the position coordinate is on the right. Then, control proceeds to step 180.

At step 180, the ECU predicts that there is a right-hand curve in the traveling direction of the vehicle. Then, based on the prediction, the ECU uses the headlamp drive section 13 to control the optical axes of the headlamps 11 in spite of the fact that the steering angle from the center position is in the range of the idle angle. Specifically, the ECU activates the swivel motor of the headlamp drive section 13 such that the optical axes of the headlamps 11 are oriented to the right by a predetermined angle (e.g., 10°) with reference to the forward direction (straight ahead direction) of the vehicle 10.

After that, the ECU 14 terminates the process of FIG. 2 and allows the optical axes of the headlamps 11 controlled as above to remain being oriented to the right to thereby retain the optical axes. The retention of the optical axes is stopped when the steering angle from the center position has exceeded the range of the idle angle. After that, the ECU 14 returns to the basic control described above and performs optical axis control of the headlamps 11 in accordance with the steering angle. In other words, the ECU performs optical axis control in accordance with the manipulation of the steering wheel in traveling along the curve. Then, when the vehicle has finished traveling along the curve and the steering angle from the center position has returned to a position in the range of the idle angle, the ECU 14 starts the process of FIG. 2 again.

The retention of the optical axes after terminating the process of FIG. 2 is stopped when the steering angle from the center position continues to stay in the range of the idle angle for a predetermined period (e.g., three seconds) or more after the termination of the process of FIG. 2. After that, the ECU 14 returns to the basic control described above and performs optical axis control of the headlamps 11 in accordance with the steering angle. In other words, the optical axes are returned to the forward direction of the vehicle.

As shown by Cases 1 to 5 above, when the image sensor 12 repeatedly outputs surrounding-object information, the ECU 14 of the present embodiment repeatedly acquires the outputted surrounding-object information (step 120). Based on the surrounding-object information, the ECU then determines whether or not the distance from a light source to the vehicle is equal to or more than a predetermined distance, whether or not the light source is of an oncoming vehicle that has newly appeared in a picked-up image, and whether or not the light source is in a predetermined area near the left end of the picked-up image or in a predetermined area near the right end thereof (steps 140, 150, 160 and 165). If the determination results are affirmative, the ECU determines that there is a curve in the traveling direction of the vehicle equipped with the present system 1. If the determination results are negative, the ECU determines that there would be no possible turn of the vehicle.

As described above, the ECU determines that there is a curve in the traveling direction of the vehicle on the basis of the fact that an oncoming vehicle has appeared near the left end or the right end of a picked-up image. Thus, the ECU is able predict a turn of the vehicle making use of the behaviors of the oncoming vehicle in a picked-up image.

One of the conditions based on which the ECU makes a determination is that the distance from a light source to the vehicle is equal to or more than the specified distance. Accordingly, in a situation where a nearby oncoming vehicle has abruptly changed lane on a straight road, an erroneous determination that a curve is present in the traveling direction of the vehicle is prevented from being made. As a result, a turn is more accurately predicted.

If the determination results mentioned above are affirmative, the ECU 14 determines that there is a left-hand curve in the traveling direction of the vehicle, on the basis of the light source's being in the predetermined area near the left end of the picked-up image. Similarly, the ECU 14 determines that there is a right-hand curve in the traveling direction of the vehicle, on the basis of the light source's being in the predetermined area near the right end of the picked-up image. In this way, a left turn or a right turn of the vehicle is distinguishably predicted.

In the process of FIG. 2, if the ECU 14 has not acquired the previous-cycle surrounding-object information at step 160, it is ensured that control proceeds to step 115.

In the foregoing embodiment, the ECU 14 performs the processing of step 120 to function as an example of the surrounding-object information acquiring means. Similarly, the ECU performs the processings of steps 140, 150, 160 and 165 to function as an example of the determining means, and performs the processings of steps 115 and 170 to 190 to function as an example of the predicting means.

(Other Embodiments)

An embodiment of the present invention has so far been described. However, the scope of the present invention is not limited to the foregoing embodiment alone, but encompasses various modes that would realize the functions of the invention-defining matters of the present invention. For example, the following modes may also be encompassed.

In the foregoing embodiment, the vehicle headlamp control system 1 has been described as an example of the turn prediction apparatus. However, the turn prediction apparatus can also be applied to systems other than the vehicle headlamp control system 1. In other words, the information as to whether there is a curve in the straight ahead direction of the vehicle is usable in applications other than the optical axis control of the headlamps 11. For example, the information may be used for pre-notification of a curve.

Further, even when the steering angle from the center position is in the idle angle, the optical axes of the headlamps 11 may be ensured to be changed in accordance with other factors (e.g., presence of an oncoming vehicle).

In the foregoing embodiment, whether or not an oncoming vehicle has entered a picked-up image of a camera from the left end or the right end of the picked-up image is ensured to be determined on the basis of the color, shape, position, distance from the vehicle, and the like of a light source in the picked-up image. However, instead of a light source, an image recognition technique, for example, may be applied to a picked-up image to specify the shape of the vehicle itself. Then, whether or not an oncoming vehicle has entered the picked-up image from the left end or the right end of the picked-up image may be ensured to be determined on the basis of the specified shape.

Specifically, in the present invention, it may only have to be ensured that: images in the forward direction of the vehicle, which have been repeatedly picked up by the a camera installed in the vehicle, are used as a basis to determine whether or not an oncoming vehicle has entered the picked-up image from the left end or the right end of the picked-up image; if the determination result is affirmative, the ECU determines that there is a curve in the traveling direction of the vehicle; and if the determination result is negative, the ECU determines that there would be no possible turn of the vehicle.

DESCRIPTION OF REFERENCES

1: Vehicle headlamp control system
10: Vehicle
11: Headlamps
12: Image sensor
13: Headlamp drive section
14: ECU
20: Oncoming vehicle

What is claimed is:

1. An apparatus for predicting a turn of a vehicle on a basis of viewing field information indicating a viewing field in a forward direction of the vehicle, the viewing field information being acquired from a sensor installed in the vehicle, the apparatus comprising:
an information acquiring unit acquiring position information on a position coordinate of a surrounding object of the vehicle on the basis of the viewing field information, the surrounding object being present in the viewing field, and surrounding-object information indicating whether the surrounding object is a preceding vehicle or an oncoming vehicle;
a determining unit determining whether or not the surrounding object is an oncoming vehicle and the surrounding object is in a predetermined area on the left side or in a predetermined area on the right side in a detection range of the viewing field, on the basis of the surrounding-object information acquired by the information acquiring unit; and
a predicting unit predicting that there is a curve in a traveling direction of the vehicle when a determination result of the determining unit is affirmative and predicts there is no possible turn of the vehicle when a determination result of the determining unit is negative; wherein
the sensor is configured to repeatedly acquire a picked-up image as the viewing field information by picking up an image in a forward direction of the vehicle;
the information acquiring unit is configured to repeatedly acquire a position coordinate of a light source in a picked-up image that is repeatedly acquired by the sensor, source information indicating whether the light source is a light source of a preceding vehicle or a light source of an oncoming vehicle, and a distance from the light source to the vehicle, as the surrounding-object information, on the basis of the picked-up image;
the determining unit is configured to determine whether or not a distance from the light source to the vehicle is not less than a specified distance, the light source is a light source of an oncoming vehicle that has newly appeared in the picked-up image, and the light source is in a predetermined area near the left end or in a predetermined area near the right end in the picked-up image, on the basis of the repeatedly acquired surrounding-object information; and
the predicting unit is configured to determine there is a left-hand curve in a traveling direction of the vehicle on the bass of the fact that the light source is in the predetermined area near the left end in the picked-up image, and determine there is a right-hand curve in a traveling direction of the vehicle on the basis of the fact that the light source is in the predetermined area near the right end in the picked-up image, when a determination result of the determining unit is affirmative.

* * * * *

UNITED STATES PATENT AND TRADEMARK OFFICE
CERTIFICATE OF CORRECTION

PATENT NO. : 9,436,881 B2
APPLICATION NO. : 14/343617
DATED : September 6, 2016
INVENTOR(S) : Koji Imaeda It is certified that error appears in the above-identified patent and that said Letters Patent is hereby corrected as shown below:

In the Claims

At Column 14, Claim number 1, Line number 60, delete "bass" and insert --basis--.

Signed and Sealed this
Tenth Day of January, 2017

Michelle K. Lee
*Director of the United States Patent and Trademark Office*